US010224025B2

(12) United States Patent
Liu et al.

(10) Patent No.: US 10,224,025 B2
(45) Date of Patent: Mar. 5, 2019

(54) SYSTEM AND METHOD FOR EVENT SUMMARIZATION USING OBSERVER SOCIAL MEDIA MESSAGES

(71) Applicant: Robert Bosch GmbH, Stuttgart (DE)

(72) Inventors: Fei Liu, Palo Alto, CA (US); Fuliang Weng, Mountain View, CA (US); Chao Shen, Miami, FL (US); Lin Zhao, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 647 days.

(21) Appl. No.: 14/105,233

(22) Filed: Dec. 13, 2013

(65) Prior Publication Data

US 2014/0172427 A1 Jun. 19, 2014

Related U.S. Application Data

(60) Provisional application No. 61/737,547, filed on Dec. 14, 2012, provisional application No. 61/904,894, filed on Nov. 15, 2013.

(51) Int. Cl.
*G06F 17/20* (2006.01)
*G10L 15/14* (2006.01)
(Continued)

(52) U.S. Cl.
CPC ............ *G10L 15/14* (2013.01); *G06F 17/28* (2013.01); *G06F 17/30719* (2013.01);
(Continued)

(58) Field of Classification Search
CPC ....................................................... G06F 17/20
(Continued)

(56) References Cited

U.S. PATENT DOCUMENTS 4,930,077 A * 5/1990 Fan ................. G06Q 30/02
379/92.03
5,271,088 A * 12/1993 Bahler ................. G10L 21/028
704/200
(Continued)

OTHER PUBLICATIONS

Chakrabarti et al., "Event Summarization Using Tweets." ICWSM 11, 2011, 66-73.*
(Continued)

*Primary Examiner* — Seong-Ah A Shin
(74) *Attorney, Agent, or Firm* — Maginot Moore & Beck LLP

(57) ABSTRACT

A method for processing messages pertaining to an event includes receiving a plurality of messages pertaining to the event from electronic communication devices associated with a plurality of observers of the event, generating a first message stream that includes only a portion of the plurality of messages corresponding to a first participant in the event, identifying a first sub-event in the first message stream with reference to a time distribution of messages and content distribution of messages in the first message stream, generating a sub-event summary with reference to a portion of the plurality of messages in the first message stream that are associated with the first sub-event, and transmitting the sub-event summary to a plurality of electronic communication devices associated with a plurality of users who are not observers of the event.

14 Claims, 7 Drawing Sheets

(51) Int. Cl.
*G06F 17/28* (2006.01)
*G10L 15/02* (2006.01)
*H04L 12/58* (2006.01)
*G06Q 50/00* (2012.01)
*G06F 17/30* (2006.01)
*H04L 12/18* (2006.01)

(52) U.S. Cl.
CPC .............. *G06Q 50/01* (2013.01); *G10L 15/02* (2013.01); *H04L 12/1859* (2013.01); *H04L 51/32* (2013.01); *H04L 12/1895* (2013.01)

(58) Field of Classification Search
USPC ...... 704/1–10, 200, 236–239, 251–257, 270, 704/E15.001–E15.05, E11.001–E11.007
See application file for complete search history.

(56) References Cited

U.S. PATENT DOCUMENTS

| | | | | |
|---|---|---|---|---|
| 5,689,716 A * | 11/1997 | Chen | ................... | G06F 17/2785 707/E17.094 |
| 5,924,108 A * | 7/1999 | Fein | ................... | G06F 17/2715 707/E17.094 |
| 6,411,930 B1 * | 6/2002 | Burges | ................... | G10L 17/04 704/236 |
| 7,565,372 B2 * | 7/2009 | Zhang | ................... | G06F 17/277 |
| 7,716,048 B2 * | 5/2010 | Pereg | ................... | G10L 25/00 379/88.01 |
| 7,925,496 B1 * | 4/2011 | Rubin | ............... | G06F 17/30719 704/10 |
| 8,131,735 B2 * | 3/2012 | Rose | ................. | G06F 17/30616 704/4 |
| 8,326,880 B2 * | 12/2012 | Carson, Jr. | ......... | G06F 17/30864 707/791 |
| 9,082,401 B1 * | 7/2015 | Fructuoso | ............... | G10L 13/08 |
| 9,092,422 B2 * | 7/2015 | Wang | ................... | G06F 17/30719 |
| 9,152,625 B2 * | 10/2015 | Louis | ........................ | G06F 17/30 |
| 2002/0174149 A1 * | 11/2002 | Conroy | ............... | G06F 17/2715 715/227 |
| 2004/0205463 A1 * | 10/2004 | Darbie | ................. | G06F 17/2229 715/205 |
| 2004/0230989 A1 * | 11/2004 | Macey | ................. | G06F 17/2705 725/24 |
| 2005/0044053 A1 * | 2/2005 | Moreno | ................ | G06K 9/6226 706/20 |
| 2006/0085187 A1 * | 4/2006 | Barquilla | ................. | G10L 13/08 704/243 |
| 2007/0133771 A1 * | 6/2007 | Stifelman | ............... | H04M 3/48 379/142.01 |
| 2008/0046241 A1 * | 2/2008 | Osburn | ................... | G10L 17/26 704/250 |
| 2008/0221877 A1 * | 9/2008 | Sumita | .................... | G10L 15/22 704/211 |
| 2008/0300872 A1 * | 12/2008 | Basu | ................. | G06F 17/30017 704/235 |
| 2010/0005485 A1 * | 1/2010 | Tian | .................. | G06F 17/30787 725/32 |
| 2011/0004465 A1 * | 1/2011 | Rose | ..................... | G06F 17/277 704/9 |
| 2011/0184806 A1 * | 7/2011 | Chen | .................... | G06K 9/6226 705/14.52 |
| 2011/0320542 A1 * | 12/2011 | Bendel | .................. | G06F 17/274 709/206 |
| 2011/0320543 A1 * | 12/2011 | Bendel | ................ | G06F 17/2229 709/206 |
| 2012/0109649 A1 * | 5/2012 | Talwar | .................. | G10L 15/005 704/236 |
| 2012/0117475 A1 * | 5/2012 | Lee | ........................ | G06Q 10/10 715/733 |
| 2012/0303355 A1 * | 11/2012 | Liu | ..................... | G06F 17/2217 704/9 |
| 2013/0262109 A1 * | 10/2013 | Latorre-Martinez | ... | G10L 15/26 704/235 |
| 2014/0068418 A1 * | 3/2014 | Yang | .................... | G06F 17/3089 715/234 |
| 2014/0172427 A1 * | 6/2014 | Liu | ......................... | H04L 51/32 704/239 |
| 2015/0006512 A1 * | 1/2015 | Alfonseca | ............... | G06F 17/24 707/722 |
| 2015/0046152 A1 * | 2/2015 | Lee | ................... | G06F 17/30705 704/9 |
| 2015/0206538 A1 * | 7/2015 | Aviles-Casco | .......... | G10L 17/00 704/246 |
| 2015/0234806 A1 * | 8/2015 | Bhagwan | ............ | G06F 17/2765 705/7.18 |

OTHER PUBLICATIONS

Chua et al., "Automatic Summarization of Events from Social Media." ICWSM. 2013.*

Nichols et al., "Summarizing sporting events using twitter." Proceedings of the 2012 ACM international conference on Intelligent User Interfaces. ACM, 2012.*

International Search Report and Written Opinion corresponding to PCT Application No. PCT/US2013/074929, dated Mar. 13, 2014 (12 pages).

Nichols, Jeffrey et al., Summarizing Sporting Events Using Twitter, Proceeedings of the 2012 ACM International Conference on Intelligent User Interfaces, Jan. 1, 2012 (10 pages).

Chua, Freddy Chong Tat et al., Automatic Summarization of Events from Social Media, Nov. 27, 2014, http://www.hpl.hp.com/research/scl/papers/socialmedia/tweet_summary.pdf (retrieved on Feb. 17, 2014) (11 pages).

Marcus, Adam et al., Twitinfo: Aggregating and Visualizing Microblogs for Event Exploration, CHI 2011, May 7, 2011 (10 pages).

Horn, Christopher et al., Realtime Ad Hoc Search in Twitter: Know Center at Trec Microblog Track 2011, Jan. 20, 2012, http://trec.nist.gov/pubs/trec20/papers/knowcenter.microblog.update.pdf (retrieved on Feb. 18, 2014) (10 pages).

* cited by examiner

SYSTEM AND METHOD FOR EVENT SUMMARIZATION USING OBSERVER SOCIAL MEDIA MESSAGES

CLAIM OF PRIORITY

This application claims priority to U.S. Provisional Application No. 61/737,547, which is entitled "Method And System For Real-Time Participant-Based Event Summarization Using Twitter Data Streams," and was filed on Dec. 14, 2012. This application claims further priority to U.S. Provisional Application No. 61/904,894, which is entitled "System And Method For Event Summarization Using Observer Social Media Messages," and was filed on Nov. 15, 2013.

TECHNICAL FIELD

This disclosure relates generally to the fields of natural language processing and text summarization, and, more specifically, to systems and methods for generating summaries of events using messages from observers of the events.

BACKGROUND

Event summarization using the social media data streams is a challenging task that has not been fully studied in the past. Existing work on automatic text summarization often focus on the news articles, as driven by the annual evaluation of DUC (Document Understanding Conference) and TAC (Text Analysis Conference). However, the news articles represent a text genre that is drastically different from the social media text. The news are often produced by the professional writers with well-polished sentences and grammatical structures. When the sentences are extracted from the documents and concatenated to form a summary, the text is often in good quality since the sentences are mostly self-explainable. For example, some social networking services including Twitter provide a service that enables users to post short messages. Observers of an event often use these services to post short messages about the event. An event with a large number of observers can often generate a large number messages that include a great deal of useful information about the event. On the other hand, the messages from are produced by a wide range of observers with different backgrounds. The messages are typically short and notoriously noisy, containing a wide variety of non-standard spellings, abbreviations, acronyms, spelling errors, and the like. When the individual messages are taken out of the conversational thread to form an event summary, the process of interpreting the meanings of the individual messages from different observers is difficult in the greater context of the event.

Compared to a static collection of news articles, the messages that describe the event also exhibit temporal fluctuations. The messages form a dynamic text stream and pulse along the timeline. The messages also cluster around important moments (a.k.a. sub-events) which represent a surge of interest from the observers. In generating the event summaries, it is crucial to identify these sub-events and include the corresponding information in the summary. Existing solutions address the problem by monitoring changes in the volume of messages and apply a peak detection algorithm to identify the sub-events. However, this may not work well since (1) the volume changes are often not easily identifiable, and (2) the identified peak times can correspond to one or two key event participants who have dominated the entire event discussions. For example, the key players in a basketball game such as Kobe Bryant can lead to high tweet volumes from the observers of the game. The general discussion of more well-known players and game highlights can overshadow other players in the game and other key sub-events which do not always garner the same volume of messages from the observers. Consequently, improvements to message analysis and summarization systems that provide summaries of events from social media messages while observers of the event produce the messages would be beneficial.

SUMMARY

An event summarization system provides a textual description of the events of interest. Given a data stream including chronologically-ordered text pieces related to an event, the event summarization system aims to generate an informative textual description that can capture all the important moments and ideally the summary are be produced in an incremental manner during the event to provide summaries of sub-event occurrences that take place during an event. The resulting summaries and related analysis tools can serve as a complimentary means to the traditional journalistic practice.

In one embodiment, a method for processing messages pertaining to an event enables a summarization system to generate summaries for sub-events that occur during the event. The method includes receiving a plurality of messages pertaining to the event from electronic communication devices associated with a plurality of observers of the event, generating a first message stream that includes only a portion of the plurality of messages corresponding to a first participant in the event, identifying a first sub-event in the first message stream with reference to a time distribution of messages and content distribution of messages in the first message stream, generating a sub-event summary with reference to a portion of the plurality of messages in the first message stream that are associated with the first sub-event, and transmitting the sub-event summary to a plurality of electronic communication devices associated with a plurality of users who are not observers of the event.

In another embodiment, a system that generates message summaries pertaining to sub-events that occur during an event has been developed. The system includes a memory configured to store programmed instructions and a plurality of messages received from a plurality of electronic communication devices associated with a plurality of observers of an event, a network device configured to receive messages from a messaging service and to transmit summarization data to a plurality of electronic communication devices associated with a plurality of users who are not observers of the event, and a processor operatively connected to the memory and the network device. The processor is configured to receive the plurality of messages pertaining to the event from the electronic communication devices associated with the plurality of observers of the event, generate a first message stream that includes only a portion of the plurality of messages corresponding to a first participant in the event, identify a first sub-event in the first message stream with reference to a time distribution of messages and content distribution of messages in the first message stream, generate a sub-event summary with reference to a portion of the plurality of messages in the first message stream that are associated with the first sub-event, and transmit the sub-event summary to the plurality of electronic communication devices associated with the plurality of users who are not observers of the event.

DETAILED DESCRIPTION

Figure 1:
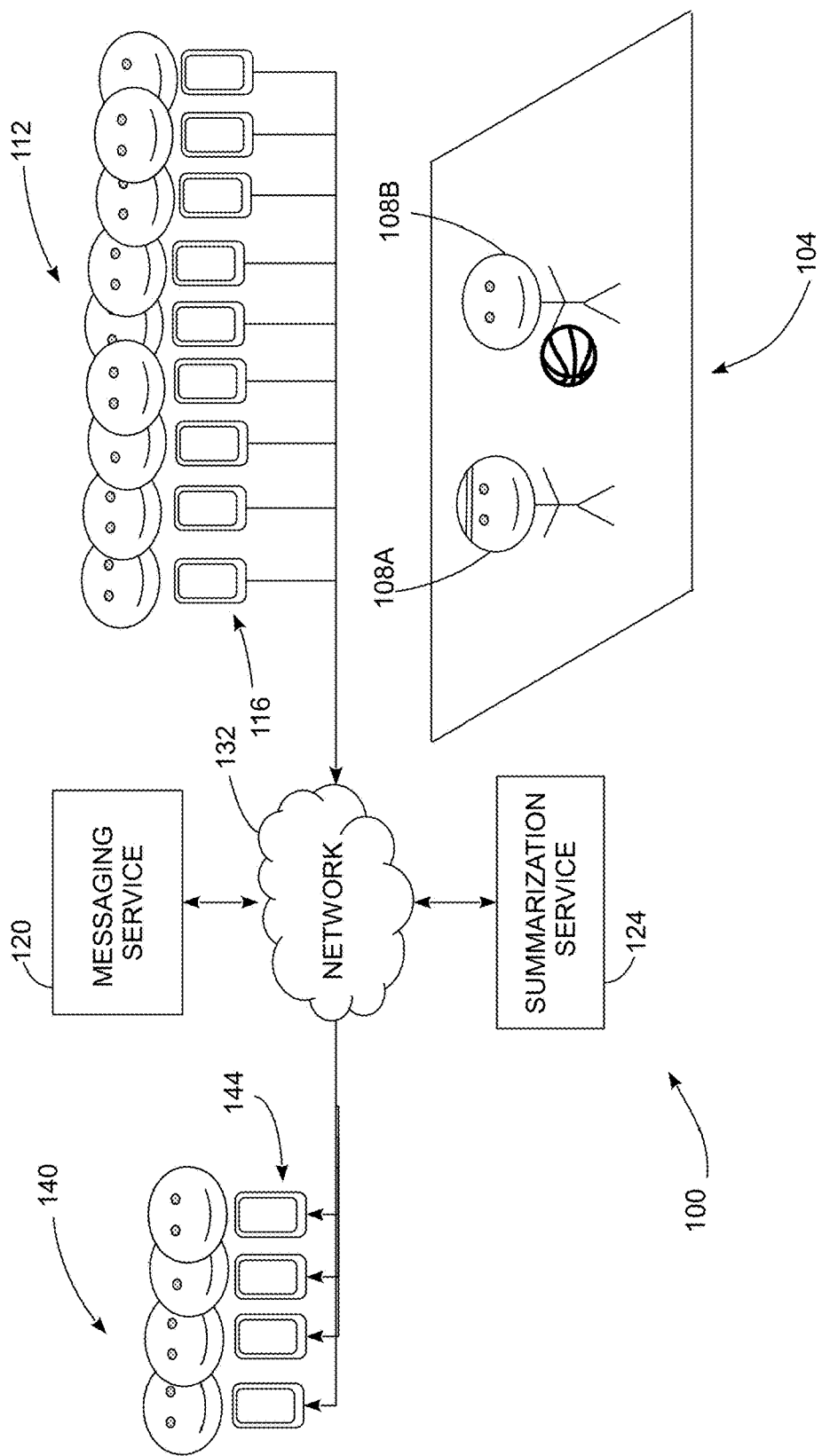
FIG. 1 is a schematic diagram of a system for generating summarizations of events from messages that are generated by a plurality of observers of the events.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "token" refers to an individual element in a text that may be extracted from the text via a tokenization process. Examples of tokens include words separated by spaces or punctuation, such as periods, commas, hyphens, semicolons, exclamation marks, question marks and the like. A token may also include a number, symbol, combination of words and numbers, or multiple words that are associated with one another. A "standard token" is a token that is part of a known language, including English and other languages. A dictionary stored in the memory of a device typically includes a plurality of standard tokens that may correspond to one or more languages, including slang tokens, dialect tokens, and technical tokens that may not have universal acceptance as part of an official language. In the embodiments described herein, the standard tokens include any token that a speech synthesis unit is configured to pronounce aurally when provided with the standard token as an input. A non-standard token, sometimes called an out-of vocabulary (OOV) token, refers to any token that does not match one of the standard tokens. As used herein, a "match" between two tokens refers to one token having a value that is equivalent to the value of another token. One type of match occurs between two tokens that each have an identical spelling. A match can also occur between two tokens that do not have identical spellings, but share common elements following predetermined rules. For example, the tokens "patents" and "patent" can match each other where "patents" is the pluralized form of the token "patent."

As used herein, the term "event" refers to any activity that includes one or more participants. Examples of events include, but are not limited to, sporting contests, keynote addresses, musical and theatrical performances, and other activities where multiple observers generate messages for social media networks to describe the event. As used herein, the term "participant" refers to humans, animals, fictional characters, and collective entities such as sports teams, corporations, and the like that are involved in an event. Individual participants in an event often interact with each other during sub-events. As used herein, the term "sub-event" refers to a portion of an event that occurs in a relatively short amount of time compared to the overall duration of the event and that generates interest in the observers. When a sub-event occurs, the observers generate social media messages that are specifically directed to the sub-event, and the messages that are directed to the sub-event typically have a Gaussian time distribution that is related to the sub-event. A "participant sub-event" refers to a sub-event that includes the actions of a particular participant. Media messages about a participant sub-event identify the particular participant and the actions of the participant in the sub-event. A "global sub-event" refers to a sub-event that includes two or more participants. Media messages about a global sub-event include participant sub-event messages for two or more participants that are identified as referring to a single global sub-event based on the time distribution and content of the messages.

As used herein, the term "background topic" refers to messages about an aspect of a larger event that are not directed to a particular sub-event but are instead related to broader topics concerning the event. For example, a background topic of conversation related to a sporting event could be directed to discussion of a player outside of the direct actions that the player takes during the sporting event. The background topic messages tend to have a uniform time distribution that differs from the Gaussian distribution of sub-event messages.

FIG. 1 depicts an event summarization system 100 that collects media messages from a plurality of observers of an event and generates text summaries of sub-events that occur during the event for one or more third-parties. For illustrative purposes, FIG. 1 depicts a professional basketball game as an event 104, but those having skill in the art should recognize that the system 100 is suitable for the generation of summarized data from the media messages of observers for many different types of events. In FIG. 1, a plurality of observers 112 generate social media messages about the event using a plurality of electronic communication devices 116. The electronic communication devices 116 transmit the media messages to a messaging service 120 through a data network 132. The system 100 includes a summarization service 124 that receives the media messages from the messaging service 120 through the data network 132 and generates summaries of sub-events that are described in the media messages for a plurality of electronic communication devices 144 that are associated with third party users 140. While FIG. 1 depicts a single messaging service 120, the summarization service 124 is configured to receive messages from multiple social networking or communication services or optionally receives the messages from the observers 112 and electronic communication devices 116 directly through the network 132.

In the example of FIG. 1, the basketball game event 104 includes multiple participants, including the individual basketball players, coaches, referees, and mascots. Collective participants also include the basketball teams who are playing the game. FIG. 1 depicts basketball player 108A (LeBron James) and basketball player 108B (Kevin Durant) for illustrative purposes. In FIG. 1, the observers 112 are humans who watch or otherwise observe the basketball game as the game takes place. The observers 112 are, for example, people who attend the game in person, view the game on television or another live video data service, or hear the game through radio or another live audio data service. The observers use the electronic communication devices 116 to enter messages for social networks about sub-events that occur during the game 104 and optionally about background topics that are related to the game or the participants generally but are not directed to specific sub-events in the game. Examples of the electronic communication devices 116 include smartphones, tablet computing devices, wearable computing devices, notebook computers, and desktop personal computers (PCs). The electronic communication devices include network devices that provide access to the data network 132 using, for example, the TPC/IP and UDP/IP network and transport protocols with one or more application layer protocols that are compatible with the message service 120.

In the system 100, the message service 120 is computing system that implements a social network service. The message service 120 receives one or more messages from the electronic communication devices 116 and publishes the messages to enable public viewing of the message content. One example of a commercially available messaging service that provides this functionality is Twitter, but any message service that receives messages from users and presents the messages for public retrieval by other computing devices can be incorporated into the system 100. In the system 100, the summarization service 124 is another computing system that retrieves an aggregate feed of public messages from the observers 112 from the messaging service 120 through the network 132. While FIG. 1 depicts the summarization service 120 as a separate computing system from the messaging service 120, the summarization service 124 is integrated with the messaging service 120 in another embodiment.

During operation, the summarization service 124 receives an aggregate stream of messages that the observers 112 transmit to the messaging service 120 during the event 104. In many instances, the messaging service 120 also receives messages from different users who are not observers of the event 104, and some of the observers 112 may generate messages that pertain to the event 104 and other messages that do not pertain to the event 104. The message summarization service 124 is communicatively connected to the messaging service 120 and one or more of the third-party electronic communication devices 144 using, for example, one or more wired or wireless network devices that enable the summarization service 124 to receive messages from the messaging service 120 and to transmit summaries of the messages that correspond to sub-events to the third-party electronic communication devices 144.

The summarization service 124 includes one or more computing devices that include digital processors and associated memory devices including volatile memory storage devices such as random access memory (RAM) and non-volatile data storage devices such as magnetic disks or solid-state storage devices. The summarization service 124 implements, for example, one or more databases to organize and store messages from the observers and associated information including language models, ontological data, keyword information, and other data that are used to generate summarizations of sub-events in the message data received from the observers 112. In one embodiment, the summarization service 124 is implemented as a cluster of multiple computing devices that each include one or more processors and are communicatively connected to the data network 132 using, for example, Ethernet or other wired network connections. As used herein, a reference to a "processor" performing an action in the summarization service 124 refers both to the operation of a single processor in a single computing device and multiple processors in one or more computing devices that implement the summarization service 124 in different embodiments. The multiple computing devices in the summarization service 124 include computing devices that execute software programs to perform both client and server computing functions. The clients in the summarization service 124 receive the messages from the messaging service 120 for storage and analysis in the summarization service 124. The servers in the summarization service 124 include web servers, instant messaging servers, simple messaging service (SMS) gateways, syndication servers such as the rich site summary (RSS), and any other suitable service that enables message the electronic communication devices 144 of the third-parties 140 to receive summaries of sub-events from the event 104. The summarization service 124 optionally includes additional computing devices that perform analysis of the messages and summary generation.

As described in more detail below, the summarization service 124 filters the messages from the messaging service 120 to identify messages from the observers 112 that include information about the participants 108A, 108B, and other participants in the event 104. The summarization service 124 then identifies sub-events that include one or more participants and uses the messages from the observers 112 to generate summarized messages about the sub-events. The third party users 140 receive the summarized messages using the electronic communication devices 144.

Figure 2:
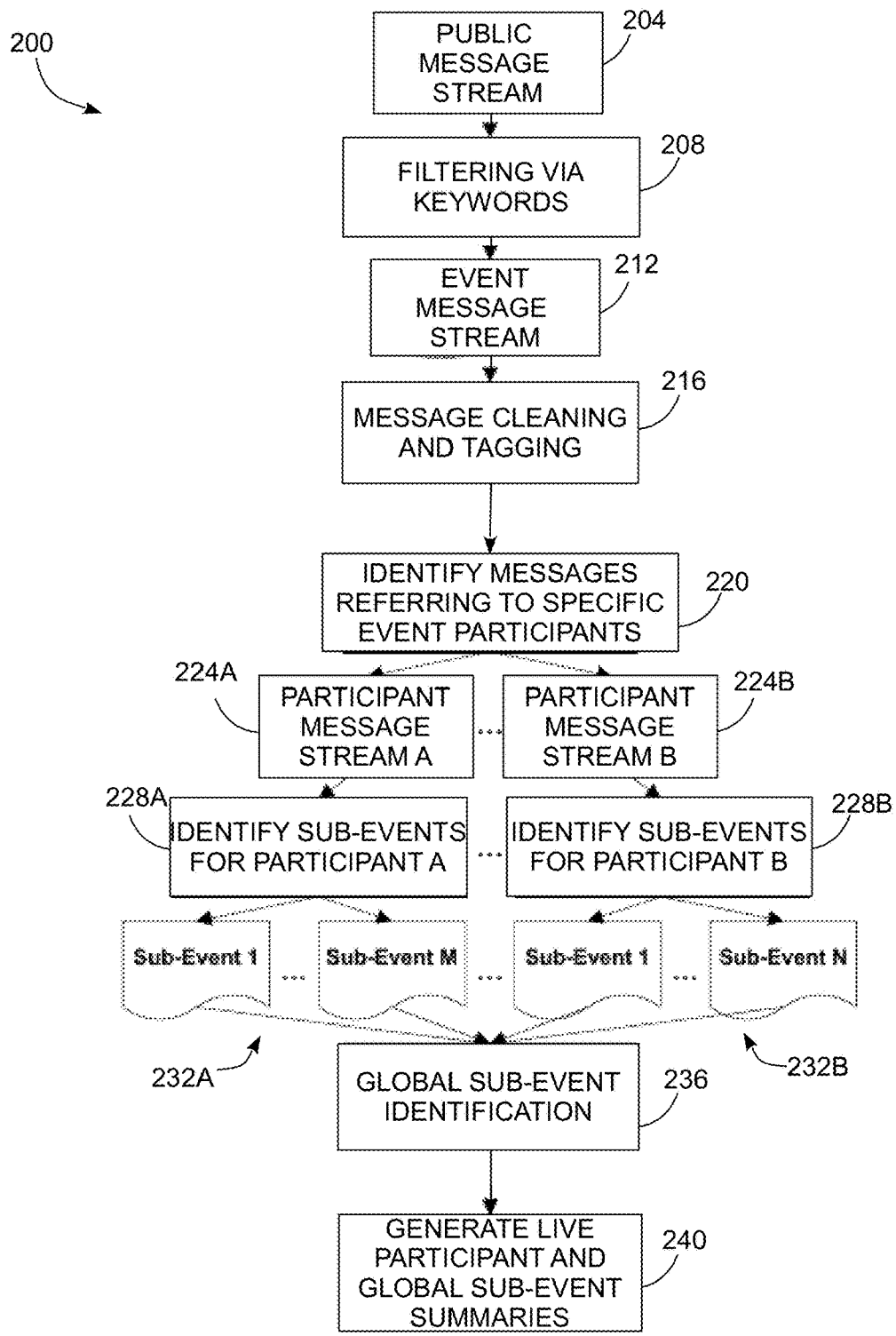
FIG. 2 is a block diagram of a process for generating the summarizations.

FIG. 2 depicts a process 200 for the generation of summaries for sub-events during an event from messages that are generated by observers of the sub-events. In the discussion below, a reference to the process 200 performing a task or function refers to the operation of a processor to execute stored program instructions to perform the task of function. The process 200 is described in conjunction with the system 100 of FIG. 1 for illustrative purposes.

Process 200 begins as the message service 120 receives a stream of messages from the electronic communication devices 116 that pertain to the event 104 and the participants 108A and 108B (block 204). The summarization service 124 retrieves the messages from the messaging service 120 using, for example, a publisher-subscriber (pub/sub) model that enables the summarization service 124 to retrieve the messages from the summarization service 124 with minimal delay. The messages include message content, such as text, an identifier of the user account for the observer who wrote the message, and a timestamp indicating when the electronic communication device 116 transmitted the message to the message service 120.

Since many messages from the message service 120 do not pertain to the event 104, the summarization service 124 performs key word filtering to identify messages that have a high likelihood of pertaining to the event 104 (block 208), the identified messages are formed into an event message stream of messages that correspond to one or more participants in the event (block 212). In one embodiment, the message summarization service 124 includes a database that stores predetermined key words about a planned event, such as the basketball game event 104. The summarization service 124 also stores information about the expected time when the event 104 occurs, and processes messages with the predetermined key words to summarize sub-events during the event. For example, the summarization service 104 stores a list of proper names, including commonly used nicknames and slang terms, which are associated with the participants in the game. Using the players 108A and 108B as examples of participants, the summarization service 124 associates the terms "LeBron James", "King James", "LBJ" and other commonly used nicknames with the player 108A, and similarly associates "Kevin Durant", "Durantula", and other nicknames with the player 108B. The summarization service 124 uses the predetermined key words to identify messages that have a high likelihood of pertaining to the event. In one embodiment, the message summarization service 124 identifies the keywords for the event prior to commencing the process 200 using search and word association techniques in a wide range of messages that are received from the message service 120 and from other media, including World Wide Web (WWW) pages and the like.

In one embodiment, the keyword filtering process also prevents the summarization service 124 from performing further processing on messages that include uniform resource locators (URLs) or are in a language other than the spoken language of the intended target audience. For example, the summarization service 124 ignores messages written in English, with the possible exception of using English proper names for certain participant names and keywords, when generating message summaries for a Chinese language audience and vice versa.

Process 200 continues with a tagging and cleaning process (block 216). The message cleaning and tagging process includes, for example, a spell checking process and other natural language processing to disambiguate grammatical errors and identify canonical representations of non-standard vernacular where feasible. In one configuration of the system 100, the summarization service 124 receives the messages from the message service 120 with minimal delay in a "live" operating mode to analyze the messages for identification and summarization of sub-events during the larger event 104. The summarization service 124 receives the messages and stores the messages in a buffer in the chronological order in which the messages were generated, which is not necessarily the order in which the summarization service 124 receives the messages. The summarization service 124 implements a "pipeline" system that generates summaries for sub-events with a comparatively short delay from the time at which the summarization service 124 receives messages that describe the sub-event to the generation of a text summary for the sub-event. The message cleaning and tagging process includes organization of groups of messages into larger segments based on the timestamps that are associated with the messages. In one embodiment, messages are grouped together into segments with a three minute time duration for each segment. The summarization service 124 analyzes the messages in a series of the three minute segments throughout the event. In one embodiment, the segments partially overlap to ensure that messages pertaining to sub-events that occur at the beginning or end of one segment are included in another segment.

Process 200 continues as the message summarization service 124 identifies messages in each message segment that identify a particular participant in the event (block 220).

Figure 4:
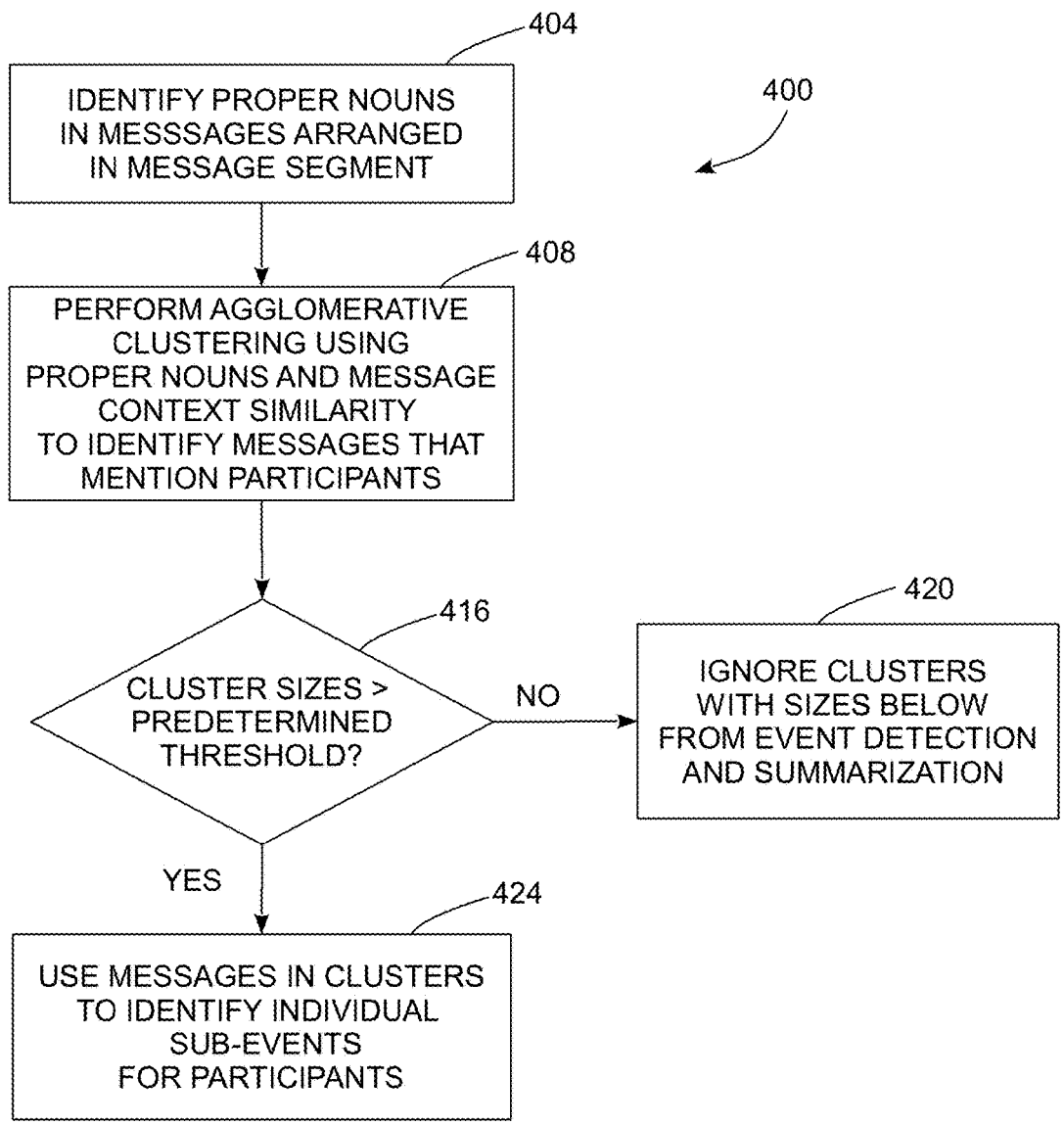
FIG. 4 is a block diagram of a process for identification of participants in an event using messages that are generated by observers of the event.

The process 200 generates a plurality of message streams for the individual participants based on the content of the messages, as depicted by the participant message streams 224A and 224B in FIG. 2. FIG. 4 depicts a diagram of a process 400 for the generation of the participant message streams in more detail. In the discussion below, a reference to the process 400 performing a task or function refers to the operation of a processor to execute stored program instructions to perform the task of function. The process 400 is described in conjunction with the system 100 of FIG. 1 for illustrative purposes.

Process 400 begins with identification of proper nouns that correspond to event participants in the list of messages that are arranged in chronological order in the segment (block 404). In the context of the event 104, the proper nouns include the names of players, predetermined nicknames for players, team names, city names, and the like. Some messages can include more than one proper noun and may be associated with more than one participant.

During process 400, many messages refer to a participant without expressly naming the participant. In some instances the messages use pronouns without appropriate context for the antecedent name of the participant, or discuss an aspect of a participant or sub-event without an express identification of the participant. Process 400 performs an agglomerative clustering process to identify messages that correspond to different participants in the event using both messages that expressly name participants and messages that do not necessarily include an express mention of the participant name but have a high similarity to the content of messages that do include the participant name (block 408). The term "agglomerative clustering" refers to a clustering process that begins with individual messages and groups messages that refer to the same participant into clusters, where each cluster corresponds to a single participant. The agglomerative clustering is referred to as a "bottom up" clustering process because the clusters begin with a single message or small group of messages that correspond to a participant and the clusters grow as the process identifies additional messages that belong to each of the initial clusters. In one embodiment, a single message may belong to multiple clusters if the message includes express or implicit references to multiple participants.

For example, one message includes the phrase "LeBron just had a huge dunk!" The phrase specifically identifies "LeBron" for the player 108A and the clustering process begins by forming a cluster of the messages that include an express identification of the participant 108A and other participants that are named in the messages. The agglomerative clustering process also uses the context of terms in the message to identify similar messages that have a high likelihood of corresponding to the participant even if the messages do not name the participant directly. For example, in one embodiment the clustering process compares messages based on metrics of lexical similarity and contextual similarity according to the following equation: $\text{sim}(c_i, c_j) = \text{lex\_sim}(c_i, c_j) \times \text{cont\_sim}(c_i, c_j)$ where the lexical similarity metric lex_sim identifies if any terms in a first message $c_i$ are an abbreviation, acronym, or part of any terms in a second message $c_j$. The lexical similarity is defined in the following function:

$$\text{lex\_sim}(c_i, c_j) = \begin{cases} 1 & c_i(c_j) \text{ is part of } c_j(c_i) \\ 1 & \text{Edit Distance } (c_i, c_j) < \theta \\ 0 & \text{Otherwise.} \end{cases}$$

In the lexical similarity equation, the Edit Distance function refers to the Levenshtein distance function that is known the art, and the term θ is a lexical similarity threshold. In one embodiment of the process 400, the threshold is identified using the following equation: $\theta = \min\{|c_i|, |c_j|\}$.

The cont_sim function is defined as the cosine similarity between the content text vectors $\vec{v}_i$ and $\vec{v}_j$ that correspond to the first message content $c_i$ and second message content $c_j$, respectively, and is depicted in the following equations: $\text{cont\_sim}(c_i, c_j) = \cos(\vec{v}_i, \vec{v}_j)$ and $$\text{cont\_sim}(c_i, c_j) = \sum_i \frac{|S_i|}{|D|} \times \text{cont\_sim}_{|S_i|}(c_i, c_j),$$

where $S_i$ is a segment in a stream of messages and D represents the total number of tweets in the stream. The cosine similarity function is a function that is known to the art for identifying the similarity between two different text strings by identifying the unique tokens in each string as a dimension in a multidimensional space. In one embodiment, the number of times that each token is repeated forms a magnitude for the dimension while in another embodiment each token represents a single dimension without regard to the number of times that the token is repeated. The similarity is identified as a value between 0 and 1 that corresponds to the cosine of the angle between the vectors for each message. In one embodiment of the process 400, a predetermined set of tokens that are referred to as "stop words" are ignored during the identification of the cosine similarity. For example, in English some common articles, conjunctions, and pronouns are ignored during identification of the cosine distance between tokens in two different messages.

The cluster process also considers messages that are within the predetermined time segment to ensure that the messages have temporal similarity. For example, during a game the player 108B may make several rebounds at different times during the game. The clustering process only selects messages within the relatively short time segment to reduce the likelihood of confusing messages from two different rebound sub-events between two different participants during the larger game event. The summarization service 124 uses the process 400 to identify clusters of messages that reference different participants based on the lexical and context similarity. In the agglomerative clustering process, smaller clusters often coalesce into larger clusters of messages that correspond to a single participant. Two clusters $C_i$ and $C_j$ have a similarity that corresponds to the maximum individual similarity between a pair of messages ci and cj in each of the clusters, respectively, as provided in the following equation: $\text{sim}(C_i, C_j) = \max_{c_i \in C_i, c_j \in C_j} \text{sim}(c_i, c_j)$. The agglomerative clustering process halts once the similarity between different clusters reaches a predetermined similarity threshold 5 to generate the separate clusters for the different participants in the event.

Process 400 continues as the summarization service 124 selects clusters for participant message streams based on the size of the clusters (block 416). The cluster size refers to the number of messages that are included in each cluster. In one embodiment, the predetermined threshold selects the N largest-sized clusters to generate message streams for up to N participants. In another embodiment, the message summarization service 124 uses any cluster that is above a predetermined cluster size, which results in a different number of clusters that correspond to different participants depending upon the sizes of the identified clusters. The summarization service 124 ignores any clusters with a size that is below the predetermined threshold (block 420), and the summarization service selects the clusters with sizes that are above the predetermined threshold to use as a basis for identifying sub-events and for message summarization in the process 200 (block 424).

During a larger event, the summarization service 124 often includes or excludes a participant during different time segments based on the context of messages that are received from the observers 112. For example, if the player 108A sits out for a few minutes, the number of messages that refer to the player 108A are likely to decrease, and the segments that cover the time when the player 108A sits out may include no clusters corresponding to the player. The process 400 also enables the summarization service 124 to identify a participant who makes a contribution that is noticed by the observers 112 but who is not as widely recognized as the other participants in the event. For example, during a basketball game a backup player may come off the bench and contribute to a sub-event. The number of messages about the backup player is typically much lower than the overall number of messages about star players in the game, but when the backup player is involved in a sub-event the summarization system 124 generates the separate participant message stream for the backup player as a separate participant during the time segments in which the backup player is involved in sub-events. The separate participant stream enables the summarization system 124 to identify sub-events that involve the backup player separately from the other participants in the event.

Figure 5:
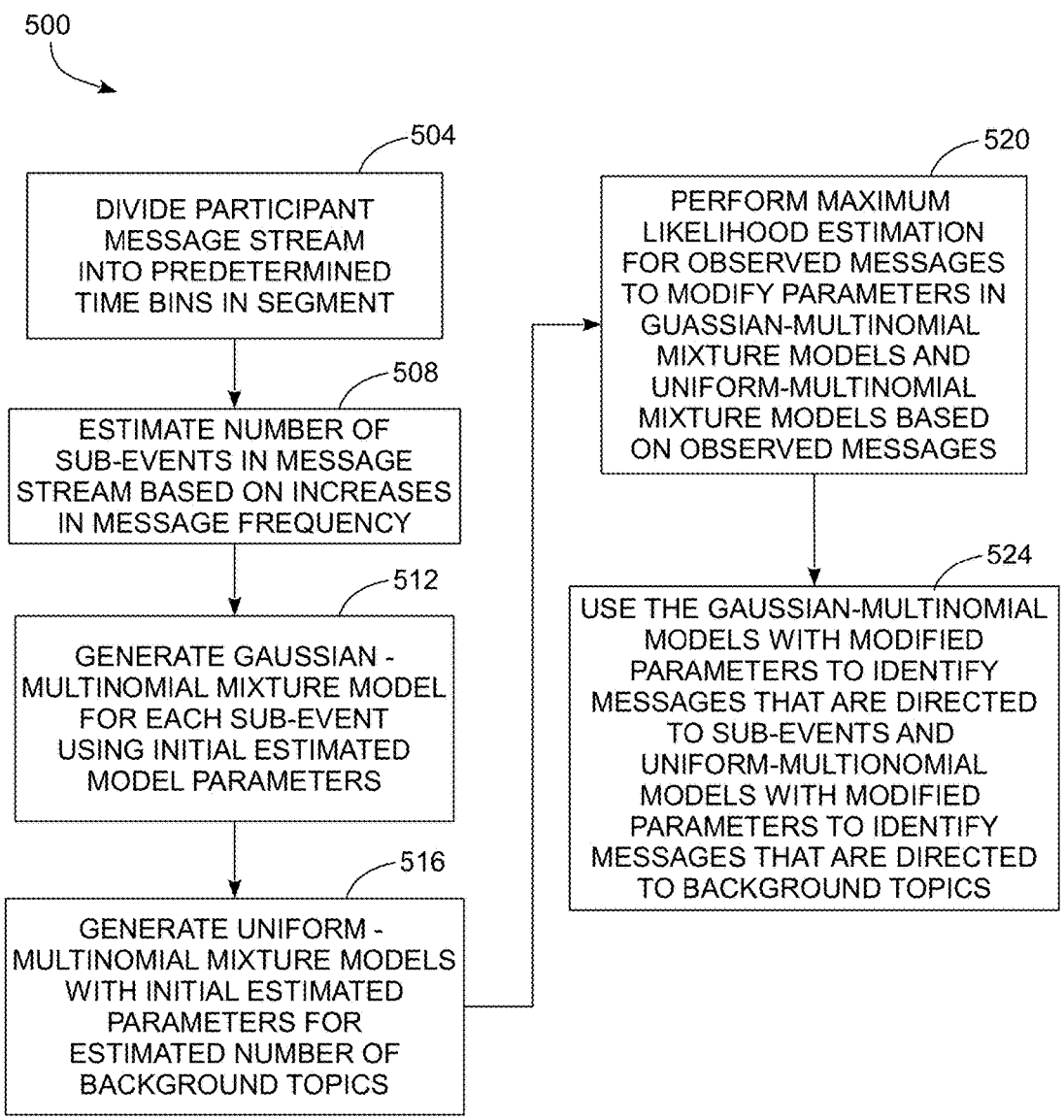
FIG. 5 is a block diagram of a process for identification of sub-events that correspond to a single participant in a participant message stream.

Referring again to FIG. 2, the process 200 continues as the summarization service 124 processes the messages that correspond to the individual participants, as depicted by message streams 224A and 224B. While FIG. 2 depicts two participant message streams for illustrative purposes, different events can have a varying number of participants. During process 200, the messages that are assigned to each cluster corresponding to a single participant from the process 400 are arranged in chronological order to form a chronological "message stream" corresponding to the participant in each time segment. The message summarization service 124 identifies sub-events from the message stream corresponding to each participant (blocks 228A and 228B). FIG. 5 depicts a process 500 for the identification of the participant sub-events and for distinguishing participant sub-events from background topics that pertain to each participant in more detail. In the discussion below, a reference to the process 500 performing a task or function refers to the operation of a processor to execute stored program instructions to perform the task of function. The process 500 is described in conjunction with the system 100 of FIG. 1, graph 300 in FIG. 3, and plate notation diagram 600 in FIG. 6 for illustrative purposes.

During process 500, the summarization service 124 identifies participant sub-events, if any are present, in a message stream that is associated with one of the participants in the event. As described above, some messages about the participant reference a sub-event, but other messages can reference the participant without referencing a specific sub-event. For example, in the event 104, a sub-event that involves the player 108A results in the observers 112 producing messages that are directed to the sub-event (e.g. "LeBron just had a huge dunk!"). The specific sub-event occurs at a particular time, and the messages from the observers 112 that refer to the sub-event typically occur with a Gaussian distribution with the first messaging being transmitted shortly after the sub-event occurs and the number of messages reaching a peak and then decreasing after the sub-event.

Figure 3:
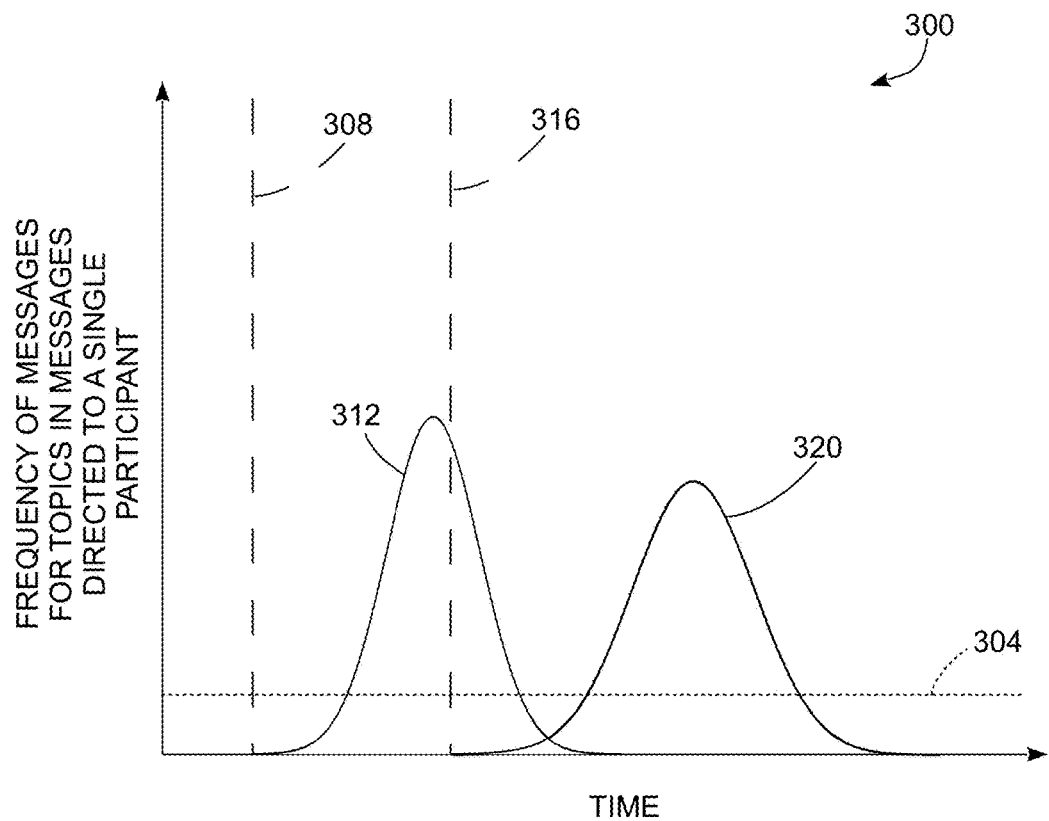
FIG. 3 is a graph depicting the time distributions for messages that correspond to background topics of messages pertaining to an event and messages that correspond to a sub-event that occurs within a portion of time during a longer event.

In FIG. 3, the graph 300 depicts time as an independent variable and the frequency of messages that are generated about a participant as the dependent variable. The graph 300 includes two sub-events 308 and 316 that occur during a predetermined time segment and that involve the participant. The Gaussian curves 312 and 320 represent the frequencies of messages that the observers 112 generate over time in response to the sub-events 308 and 316, respectively. As depicted in the graph 300, the Gaussian curves 312 and 320 have different mean values on the time axis based on the different times at which the sub-events 308 and 316 occur, respectively, and the curves 312 and 320 can have different peak amplitudes and widths (standard deviations). The two Gaussian curves 312 and 320 are characterized using the different mean (u), and duration (a) parameters. In the process 500, the peak amplitude of each Gaussian curve is not strictly required for identifying the messages that correspond to each sub-event, but the peak amplitude data may be used for other purposes to, for example, identify the popular interest in the sub-event amongst the observers 112.

FIG. 3 also depicts a line 304 that corresponds to the frequency of messages that are directed to a background topic involving the participant. The background topics of messages relate to a participant in general, but are not directed to the player in general. For example, comments about the color scheme of the headband that player 108A wears during the game or comments about MVP prospects of the player 108B are directed to participants in the event, but are not directly related to a sub-events that involve the participants. The background topics are modeled with a uniform distribution since the messages that are directed to background topics are independent of the sub-events that occur during the event and typically do not experience large variations in frequency during the time period of the event.

As depicted in FIG. 3, the distribution of messages that correspond to a particular sub-event depend on the time at which the sub-event occurs, but the time distribution of the messages alone is insufficient to identify messages that are directed to the sub-event with great accuracy. As depicted in FIG. 3, messages for two or more different sub-events can overlap in time, as depicted by the overlap of the curves 312 and 320. Furthermore, messages that are directed to background topics occur throughout the event and occur concurrently to the messages that are directed to a particular sub-event. Consequently, the summarization service 124 identifies messages that correspond to different sub-events and messages that correspond to background topics using Gaussian and multinomial distribution mixture models to identify messages that correspond to sub-events, and normal and multinomial distribution mixture models to identify messages that correspond to background topics. The multinomial distributions are used to identify messages with similar tokens to identify similar messages by content. Each multinomial distribution uses a parameter θ that corresponds to a distribution of expected tokens in messages that correspond to the mixture model. The messages with contents that are generated contemporaneously to the time values Gaussian curves correspond to a sub-event, while messages with content that appears before during and after sub-events occur correspond to the background topics. As described in more detail below, the process 500 uses a maximum likelihood estimation process (MLE) to identify the parameters for the mixture models that are used to identify messages that correspond to sub-events.

During process 500, the summarization service 124 divides the messages in the message stream into a plurality of "bins" that are based on a predetermined time increment (block 504). For example, in one embodiment a message stream segment has a three minute (180 second) duration. The summarization service 124 divides the segment into eighteen bins that are each ten seconds in length. The messages are assigned to the bins based on the timestamps associated with each message. Thus, some bins contain messages with similar time stamps that are directed to one or more sub-events or background topics.

During process 500, the summarization service identifies an estimate for the number of sub-events that occur during the message segment by identifying increases in message frequency that are indicative of a set of messages that refer to a sub-event (block 508). In one embodiment, the summarization service 124 identifies the number of messages in each bin of the segment and identifies large increases in the number of messages in a series of bins to identify potential sub-events. The summarization service 124 optionally identifies the average number of messages that are sent regarding background topics from previous message segments during the event to identify an expected number of background messages for the participant. In alternative embodiments, signal processing techniques that are known to the art for "spike" detection can be used to identify potential sub-events. While the detection of spikes in message traffic is helpful in generating an estimate of the number and distribution of sub-events, the spike detection process is not completely reliable and the initial estimates of the sub-events may not be completely accurate due to the presence of noise in the participant message stream. As described below, the initial estimate of the number of sub-events can change during the MLE process that generates estimated parameters for the mixture models to improve the accuracy of sub-event detection and message classification.

Process 500 continues as the estimation service 124 generates initial Gaussian-multinomial mixture models (block 512) and initial uniform-multinomial mixture models (block 516). As described above, the Gaussian portion of each mixture model includes the parameter μ that corresponds to the mean value of the Gaussian curve in time and the parameter σ that corresponds to the standard deviation, or width, of the Gaussian curve. The estimation service 124 identifies the initial estimate for μ from the time bins that correspond to peak message frequency for each of the estimated sub-events, and the initial estimate for a from the number of bins that correspond to the identified increase in message traffic for the sub-event. The estimation service 124 also identifies the estimated tokens θ from the messages that correspond to the time of the identified sub-event. Some of the messages θ correspond to background topics that are generated concurrently to the messages about the sub-event, but the initial estimated parameters for the multinomial distribution includes both messages.

Figure 6:
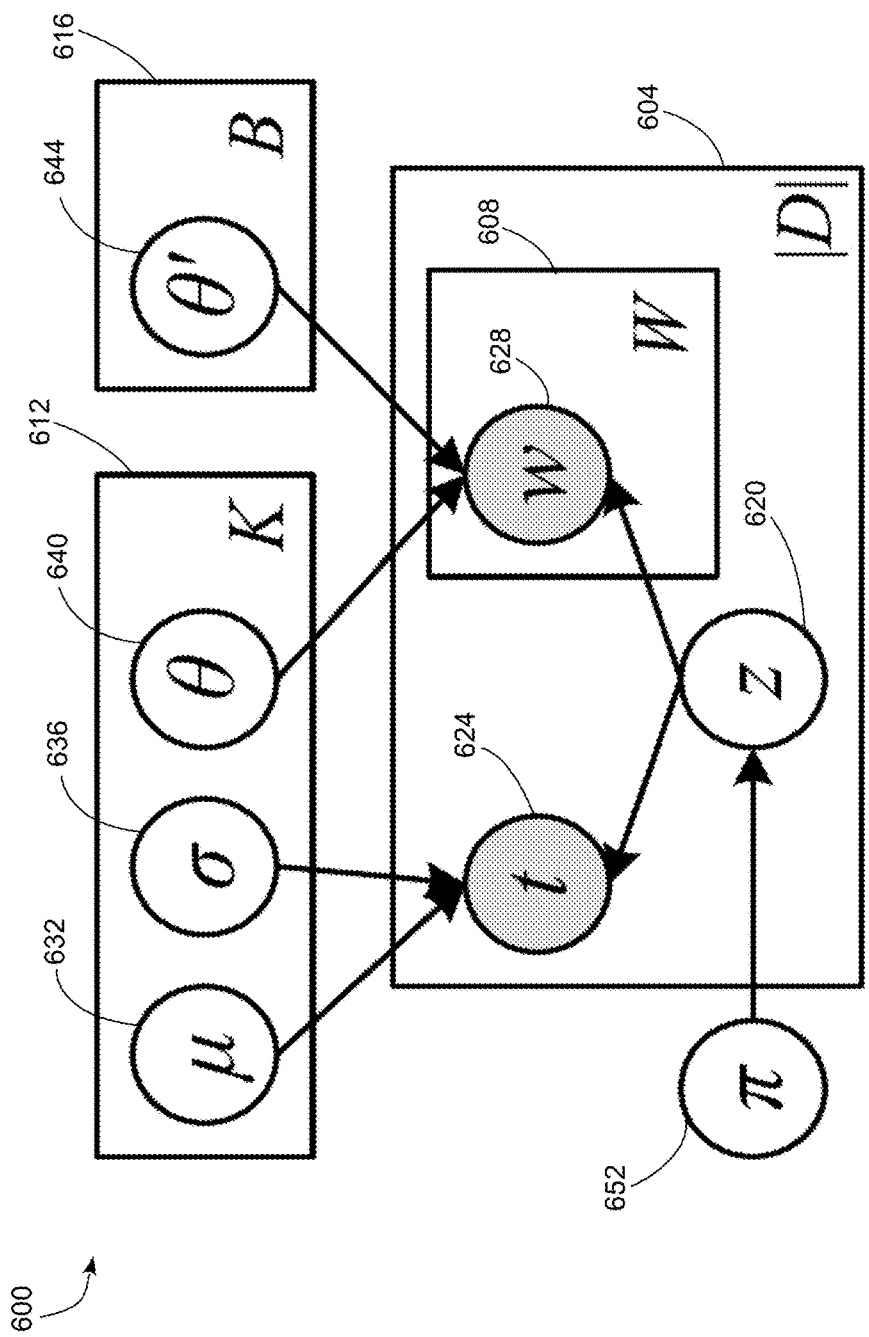
FIG. 6 is a plate diagram of a mixture model that identifies sub-events from messages in the participant message stream.

FIG. 6 depicts a plate notation diagram 600 of a Gaussian-multinomial mixture model. In the diagram 600, the plate |D| 604 represents the series of predetermined time bins that divide the time segment, the plate W 608 represents tokens (words) in the message stream for the participant, the plate K 612 represents Gaussian-multinomial mixture models for K sub-events, and the plate B 616 represents the uniform-multinomial mixture models for the background topics B. In the diagram 600, the terms t 624 and w 628 refer to times and words, respectively, that are associated with a topic z 620. The sub-event mixture models 612 include the model parameters μ 632, a 636, and θ 640, and the background topic mixture models 616 include the model parameters θ 644. The input term π 652 represents to one or more messages that are in one of the time bins D. The mixture models in the diagram 600 identify the probability that the messages 652 correspond to one of the sub-event mixture models 612 or one of the background mixture models 616 based on both the time at which the messages 652 are generated and based on the tokens that are present in the messages 652. The likelihood that the messages π are part one of the topics z is identified as a weighting factor $\pi_z$.

The estimation service 124 generates the estimated parameters of the uniform-multinomial mixture models based on the average number of messages that are identified during the time bins that are not associated with a particular sub-event and with the tokens θ' in the messages for the time bins that are associated with background topics. In one embodiment the summarization service generates the uniform-multinomial models for a predetermined number of background topics. Since the background topics do not vary greatly between segments of the message stream, the summarization service 124 optionally generates the uniform-multinomial mixture models based on the models that were used in one or more previous time segments during the event. During process 500, the summarization service 124 generates the Gaussian-multinomial mixture models and normal-multinomial mixture models in any order or concurrently.

Process 500 continues as the summarization service 124 performs the maximum likelihood estimation (MLE) process to modify the initial estimates of the parameters in the Gaussian-multinomial and uniform-multinomial mixture models (block 520). The MLE process modifies the parameters based on the likelihood of an output from the estimated mixture model conditioned on the observed time and content distributions of messages in the message stream. The following equation represents the likelihood: $L(D) = \Pi_{d \in D} \Sigma_z \{\pi_z p_z(t_d) \Pi_{w \in D} p_z(w)\}$ where $p_z(t_d)$ corresponds to the frequency or total number of messages that are generated during a particular time bin d at time $t_d$, and $p_z(w)$ corresponds to a word distribution for a given topic z. The sub-event topics have multinomial word distributions $p(w; \theta_z)$ while the background topics have a different set of multinomial word distributions $p(w; \theta_z')$. The following expressions define the terms $p_z(t_d)$ and $p_z(w)$ where N represents a Gaussian (normal) distribution and U represents a uniform time distribution:

$$p_z(t_d) = \begin{cases} N(t_d; \mu_z, \sigma_z) & \text{if } z \text{ is a sub-event topic} \\ U(t_b, t_e) & \text{if } z \text{ is a background topic} \end{cases}$$

$$p_z(w) = \begin{cases} p(w; \theta_z) & \text{if } z \text{ is a sub-event topic} \\ p(w; \theta_z') & \text{if } z \text{ is a background topic} \end{cases}$$

The summarization service 124 performs the MLE estimation process in an iterative manner to with both a modeling update process to modify the parameters in the mixture models and an estimation process to identify likelihood values that each message in the segment corresponds to the sub-event mixture models or the background mixture models. The estimation process is defined for messages in a given time bin d with mixture model equations that are indexed by the term j where the first K mixture models correspond to the sub-events and the remaining mixture-models correspond to background topics:

$$p(z_d = j) \propto \begin{cases} \pi_j N(d; u_z, \sigma_z) \prod_{w \in d} p(w; \theta_j) & \text{if } j \leq K \\ \pi_j U(t_b, t_e) \prod_{w \in d} p(w; \theta_j') & \text{if } j > K \end{cases}$$

The model update process modifies the parameters in each of the combination models to maximize the likelihood that the observed messages correspond to one of the models using the following equations:

$$\pi_j \propto \sum_d p(z_d = j)$$

$$p(w; \theta_j) \propto \sum_d p(z_d = j) \times c(w, d)$$

$$p(w; \theta_j') \propto \sum_d p(z_d = j) \times c(w, d)$$

$$\mu_j = \frac{\sum_d p(z_d = j) \times t_d}{\sum_{j=1}^{K} \sum_d p(z_d = j)}$$

$$\sigma_j^2 = \frac{\sum_d p(z_d = j) \times (t_d - \mu_j)^2}{\sum_{j=1}^{K} \sum_d p(z_d = j)}$$

During the MLE process, the estimation service 124 merges two or more of the sub-event mixture models K may into a single sub-event mixture model if the modifications to the mean time parameter μ in the mixture models place the mean times for each sub-event in close proximity. For example, two sub-event mixture models from the initial model estimation process with mean time parameters μ are initially separated by 60 seconds, but if the MLE process adjusts parameters μ to within a predetermined time offset (e.g. 10 seconds) the summarization service 124 merges the two sub-events into a single sub-event mixture model. Additionally, in some instances the summarization service 124 generates an initial estimate that a series of messages correspond to a sub-event when MLE process later identifies that the messages correspond to a background topic. If the standard deviation parameter σ for a sub-topic mixture model exceeds a predetermined threshold, then the summarization service 124 changes the topic from a sub-event topic to a background topic, and updates the mixture model accordingly. During process 500 the summarization service 124 performs the MLE process in an iterative manner until two successive iterations of the MLE process produce the same number of sub-event mixture models and background models.

The process 500 continues as the summarization service 124 uses the generated Gaussian-multinomial mixture models and uniform-multinomial mixture models to classify each message in the message stream for the participant as corresponding to a particular sub-event or corresponding to one of the background topics (block 524). Using the plate diagram 600 in FIG. 6 as an example, the message summarization service 124 processes each message π to identify the weight $\pi_z$ that corresponds to the message from each of the z mixture models, which include both the sub-event and background topic models. As described above, both the time and message contents of the π affect the weighting values. In one embodiment, the summarization service 124 assigns the message π to the sub-event or background topic corresponding to the maximum weight value $\pi_{zmax}$ amongst the z mixture models. In some embodiments, the summarization service 124 ignores messages with a maximum weight value that falls below a predetermined threshold, which reduces or eliminates the inclusion of outlier messages that are not strongly associated with any of the z mixture models.

Referring again to FIG. 2, the summarization service 124 performs the sub-event detection process 500 for the message streams from each of the participants to produce a set of one or more sub-events for each participant, such as the sub-events sets 232A and 232B that are associated with the participants 228A and 228B, respectively. While not expressly illustrated in FIG. 2, in some instance the summarization service 124 identifies a participant message stream, but the message stream does not include any sub-events. The summarization service 124 ignores participant message stream that do not include any sub-event topics, but the messages that are associated with background event topics can be used for other purposes.

During process 200, the summarization service 124 identifies global sub-events, which are sub-events that involve multiple participants (block 236). The message stream for each of the participants involved in the global sub-event includes a corresponding participant sub-event that includes messages mentioning the particular participant. An example of a global sub-event occurs when the two participants 108A and 108B interact with each other during the event 104. For example, when the participant 108B steals the basketball from the participant 108A, the observers 112 produce messages that mention one or both of the participants. Examples of the messages include "Ball stolen from LeBron," "Durant with a big takeaway," and "Durant steals the ball from James." Some of the messages refer to the sub-event (the stolen basketball) from the perspective of the only one of the participants, while other messages refer to both participants. Since the messages refer to the same sub-event, the participant message streams for both participants include participant sub-events with similar mean time values.

Figure 7:
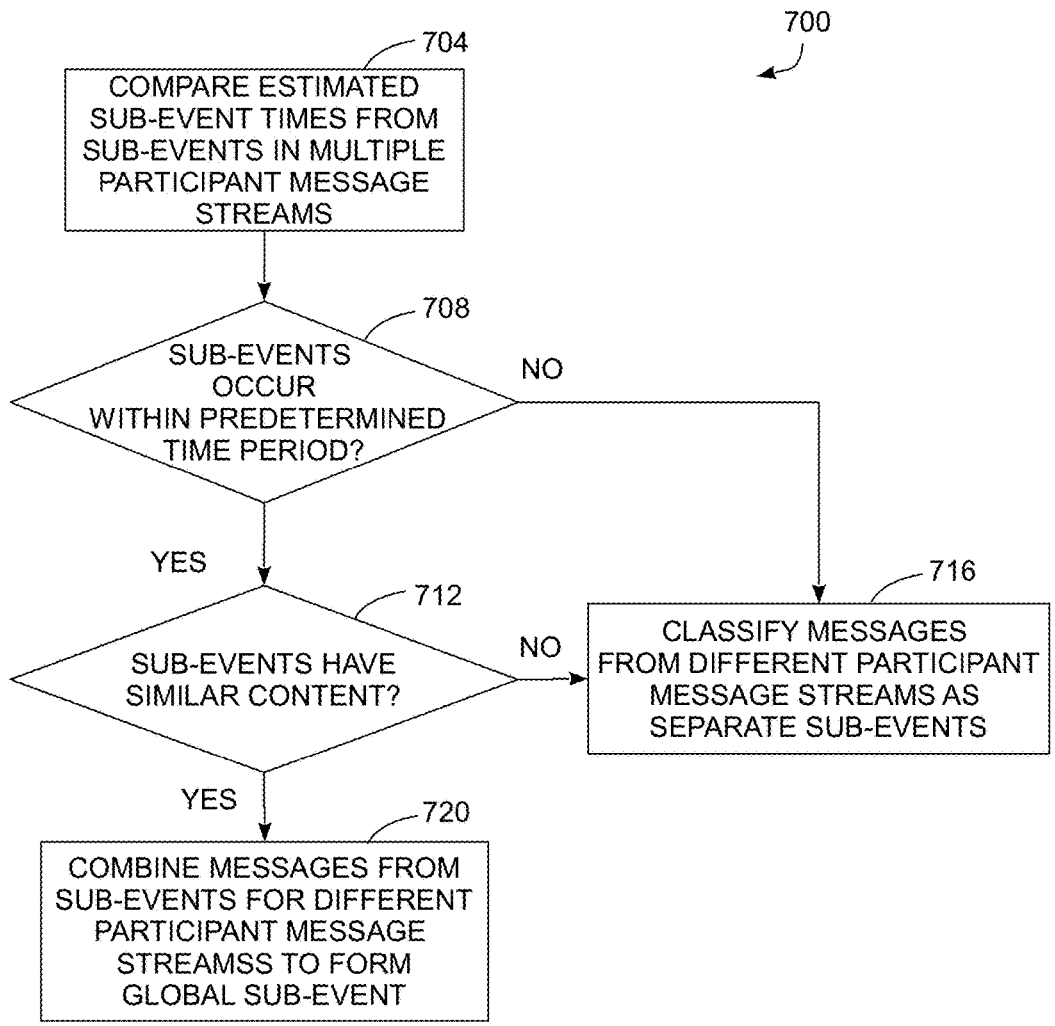
FIG. 7 is a block diagram of a process for identifying sub-events for multiple participants that correspond to a global sub-event that involves multiple participants.

FIG. 7 depicts a process 700 for the global sub-event identification in the process 200. In the discussion below, a reference to the process 700 performing a task or function refers to the operation of a processor to execute stored program instructions to perform the task of function. The process 700 is described in conjunction with the system 100 of FIG. 1 and the graph 300 of FIG. 3.

Process 700 begins with a comparison of estimated times at which sub-events occur in the participant message streams for two or more participants during a single time segment (block 704). As described above, the sub-events are modeled in time as Gaussian distributions of messages. The estimated time for the event is identified with reference to the identified mean value of the Gaussian distribution and the standard deviation to identify the time at which the observers 112 begin to produce messages corresponding to the sub-event. For example, as depicted in FIG. 3, the sub-events 308 and 316 are estimated to occur near the earliest point on the time axis where the corresponding Gaussian distribution curves 312 and 320, respectively, begin. The mean value of the Gaussian curves identifies the peak time, and the standard deviation provides information corresponding to the width of the curves to enable estimation of the time at which the sub-event occurs.

If the estimated times for two or more events occur within a predetermined time period (block 708) and if the sub-events have similar content (block 712), then the summarization service 124 combines the messages from the message streams for the multiple participants to form a global sub-event (block 720). In one embodiment, the summarization service 124 uses the cosine similarity metric from the agglomerative clustering process that is described in the process 400 to identify if the contents of messages in the two sub-events are sufficiently similar to each other to be combined into a single global event. In another embodiment, the summarization service applies a Jaccard index to the messages that are associated with the first and second sub-events to identify a Jaccard coefficient, which is a coefficient that corresponds to the similarity between the content of messages in both sub-events. If the Jaccard coefficient is above a predetermined threshold, then the messages associated with both sub-events are considered to describe the same global sub-event for the two participants. Additionally, the presence of common messages that name multiple participants in the global event and that are included in the sub-events for each of the participants is another indicator that the individual participant sub-events describe a common global sub-event.

If either the estimated time of the sub-events (block 708) or the content of the messages that correspond to different sub-events (block 712) in different participant message streams do not correspond to each other, then the summarization service 124 classifies the participant sub-events from the individual participant message streams as separate sub-events (block 716). In some configurations, the summarization service 124 generates summaries for both global sub-events and participant sub-events that only correspond to a single participant, while in other configurations the summarization service 124 only generates event summaries for global sub-events.

Referring again to FIG. 2, the process 200 continues as the event summarization service 124 generates live summaries of the event using the messages in one or more of the identified sub-events (block 240). In one embodiment, the message summarization system uses natural language processing (NLP) techniques to identify relevant sentences in the messages that correspond to the identified sub-event. Since the process 200 groups messages together for a particular participant sub-event or global sub-event, the summarization process identifies sentences and phrases from the messages that are most likely to be understood as relevant by human readers in a summary message. The summarization service 124 transmits event summaries using one or more sentences that are extracted from the messages for each sub-event to the electronic communication devices 144 of the third party users 140.

Process 200 continues for additional segments of messages from the observers 112 during the event 104 as the summarization service 124 to generate summaries of participant sub-events and global sub-events. Thus, the event summarization system 100 provides summaries of the sub-events to the electronic communication devices 144 of the third party users 140 throughout the course of the event 104. The process 200 in FIG. 2 focuses on the identification of messages that correspond to sub-events from one or more participants for summarization of the participant sub-events and global sub-events. In another configuration, the summarization service 124 generates summarized information about messages in one or more of the background topics. Additionally, the message data and the associations between the message data for a participant and sub-event or background topics can be used for other purposes beside message summarization.

It will be appreciated that variants of the above-disclosed and other features and functions, or alternatives thereof, may be desirably combined into many other different systems, applications or methods. For example, while the foregoing embodiments are configured to process messages that include English words, various other languages are also suitable for use with the embodiments described herein. Various presently unforeseen or unanticipated alternatives, modifications, variations or improvements may be subsequently made by those skilled in the art that are also intended to be encompassed by the following claims.

What is claimed is:

1. A method of processing messages pertaining to an event comprising:
   receiving, with a network device in a summarization system, a plurality of input messages generated by a plurality of electronic communication devices from a messaging service;
   filtering, with the processor in the summarization system, the plurality of input messages based on a keyword filter to identify a plurality of messages pertaining to the event based on messages generated by a plurality of electronic communication devices associated with a plurality of observers of the event;
   generating, with the processor in the summarization system, a first message stream that includes a first plurality of messages selected from the plurality of messages pertaining to the event corresponding to a first participant in the event;
   generating, with the processor in the summarization system, a second message stream that includes a second plurality of messages selected from the plurality of messages pertaining to the event corresponding to a second participant in the event, the second participant being different than the first participant, at least one message in the first plurality of messages not being in the second plurality of messages and at least one message in the second plurality of messages not being in the first plurality of messages;
   identifying, with the processor in the summarization system, a first sub-event in the first message stream with reference to a time distribution and a content distribution of the first plurality of messages in the first message stream, the identification of the first sub-event further comprising:
      identifying, with the processor in the summarization system, a first sub-event time corresponding to an increase in message frequency in the first message stream;
      generating, with the processor in the summarization system, a first estimated mixture model of the first sub-event with a Gaussian distribution corresponding to the first sub-event time and a multinomial distribution corresponding to content of messages at the first sub-event time; and
      generating, with the processor in the summarization system, the first estimated mixture model for the first sub-event with a maximum likelihood estimation (MLE) process applied to the first estimated mixture model with reference to the plurality of messages in the first message stream;
   identifying, with the processor in the summarization system, a second sub-event in the second message stream with reference to a time distribution and a content distribution of the second plurality of messages in the second message stream, the identification of the second sub-event further comprising:
      identifying, with the processor in the summarization system, a second sub-event time corresponding to an increase in message frequency in the second message stream;
      generating, with the processor in the summarization system, a second estimated mixture model of the second sub-event with a Gaussian distribution corresponding to the second sub-event time and a multinomial distribution corresponding to content of messages at the second sub-event time; and
      generating, with the processor in the summarization system, the second estimated mixture model for the second sub-event with the MLE process applied to the second estimated mixture model with reference to the plurality of messages in the second message stream;
   identifying, with the processor in the summarization system, a global sub-event corresponding to the first sub-event and the second sub-event in response to both the first sub-event time and the second sub-event time occurring within a predetermined time period;
   generating, with the processor in the summarization system, a sub-event summary with reference to the global sub-event, the sub-event summary being based on the first plurality of messages in the first message stream that are associated with the first sub-event and the second plurality of messages in the second message stream that are associated with the second sub-event; and
   transmitting, with the network device in the summarization system, the sub-event summary to a plurality of electronic communication devices associated with a plurality of users who are not observers of the event.

2. The method of claim 1, the identification of the global sub-event further comprising:
   identifying, with the processor in the summarization system, a level of similarity between the first plurality of messages that are associated with the first sub-event and the second plurality of messages that are associated with the second sub-event; and
   identifying the global sub-event corresponding to the first sub-event and the second sub-event in response to the identified level of similarity exceeding a predetermined threshold.

3. The method of claim 1, the generation of the first message stream further comprising:
   identifying, with the processor in the summarization system, a reference to the first participant in at least one message in the plurality of messages pertaining to the event; and
   generating, with the processor in the summarization system, a cluster of messages including the at least one message and at least one additional message in the plurality of messages pertaining to the event that have a level of similarity to the at least one message that exceeds a predetermined threshold, the cluster of messages being included in the first plurality of messages.

4. The method of claim 3, the generation of the cluster of messages further comprising an agglomerative clustering process.

5. The method of claim 1, the identification of the first sub-event further comprising:
   identifying, with the processor in the summarization system, a portion of the first plurality of messages in the first message stream, the portion including at least two messages in the first plurality of messages, with reference to a sub-event mixture model including a Gaussian time distribution and a multinomial content distribution for the portion of the messages that correspond to the first sub-event.

6. The method of claim 1 further comprising:
identifying, with the processor in the summarization system, a third sub-event time corresponding to another increase in message frequency in the first message stream;
generating, with the processor in the summarization system, a third estimated mixture model of the third sub-event with another Gaussian distribution corresponding to the third sub-event time and another multinomial distribution corresponding to content of messages at the third sub-event time;
identifying, with the processor in the summarization system, that a sub-event does not occur at the third sub-event time in response to the MLE process applied to the third estimated mixture model generating a Gaussian distribution with a parameter corresponding to standard of error exceeding a predetermined threshold.

7. The method of claim 1 further comprising:
identifying, with the processor in the summarization system, a third sub-event time corresponding to another increase in message frequency in the first message stream;
generating, with the processor in the summarization system, a third estimated mixture model of the third sub-event with another Gaussian distribution corresponding to the third sub-event time and another multinomial distribution corresponding to content of messages at the third sub-event time;
identifying, with the processor in the summarization system, that the third estimated mixture model corresponds to the first sub-event time in response to the MLE process applied to the third estimated mixture model generating a Gaussian distribution with a parameter corresponding to a mean time being within a predetermined threshold of a mean time parameter of the Gaussian distribution in the first estimated mixture model; and
merging the first estimated mixture model and the third estimated mixture model.

8. A message summarization system comprising:
a memory configured to store programmed instructions and a plurality of messages received from a plurality of electronic communication devices associated with a plurality of observers of an event;
a network device configured to receive messages from a messaging service and to transmit summarization data to a plurality of electronic communication devices associated with a plurality of users who are not observers of the event; and
a processor operatively connected to the memory and the network device, the processor being configured to:
receive a plurality of input messages from the messaging service, the plurality of input messages being generated by a plurality of electronic communication devices;
filter the plurality of input messages based on a keyword filter to identify a plurality of messages pertaining to the event based on messages generated by a plurality of electronic communication devices associated with a plurality of observers of the event;
generate a first message stream that includes a first plurality of messages selected from the plurality of messages pertaining to the event corresponding to a first participant in the event;
identify a first sub-event in the first message stream with reference to a time distribution of messages and content distribution of messages in the first message stream, the processor being further configured to:
identify a first sub-event time corresponding to an increase in message frequency in the first message stream;
generate a first estimated mixture model of the first sub-event with a Gaussian distribution corresponding to the first sub-event time and a multinomial distribution corresponding to content of messages at the first sub-event time; and
generate the sub-event mixture model with a maximum likelihood estimation (MLE) process applied to the first estimated mixture model with reference to the plurality of messages in the first message stream;
generate a second message stream that includes a second plurality of messages selected from the plurality of messages pertaining to the event corresponding to a second participant in the event, the second participant being different than the first participant, at least one message in the first plurality of messages not being in the second plurality of messages and at least one message in the second plurality of messages not being in the first plurality of messages;
identify a second sub-event in the second message stream with reference to a time distribution of messages and content distribution of messages in the second message stream, the processor being further configured to:
identify a second sub-event time corresponding to an increase in message frequency in the second message stream;
generate a second estimated mixture model of the second sub-event with a Gaussian distribution corresponding to the second sub-event time and a multinomial distribution corresponding to content of messages at the second sub-event time; and
generate the second estimated mixture model for the second sub-event with the MLE process applied to the second estimated mixture model with reference to the plurality of messages in the second message stream;
identify a global sub-event corresponding to the first sub-event and the second sub-event in response to both the first sub-event time and the second sub-event time occurring within a predetermined time period;
generate a sub-event summary with reference to the global sub-event, the sub-event summary being based on the first plurality of messages in the first message stream that are associated with the first sub-event and the second plurality of messages in the second message stream that are associated with the second sub-event; and
transmit the sub-event summary to the plurality of electronic communication devices associated with the plurality of users who are not observers of the event.

9. The system of claim 8, the processor being further configured to:
identify a level of similarity between the first plurality of messages that are associated with the first sub-event and the second plurality of messages that are associated with the second sub-event; and
identify the global sub-event corresponding to the first sub-event and the second sub-event in response to the identified level of similarity exceeding a predetermined threshold.

10. The system claim 8, the processor being further configured to:
  identify a reference to the first participant in at least one message in the plurality of messages pertaining to the event; and
  generate a cluster of messages including the at least one message and at least one additional message in the plurality of messages pertaining to the event that have a level of similarity to the at least one message that exceeds a predetermined threshold, the cluster of messages being included in the first plurality of messages.

11. The system of claim 10, the processor being further configured to perform an agglomerative clustering process to generate the cluster of messages.

12. The system of claim 8, the processor being further configured to:
  identify a portion of the first plurality of messages in the first message stream, the portion including at least two messages in the first plurality of messages, with reference to a sub-event mixture model including a Gaussian time distribution and a multinomial content distribution for the portion of the messages that correspond to the first sub-event.

13. The system of claim 8, the processor being further configured to:
  identify a third sub-event time corresponding to another increase in message frequency in the first message stream;
  generate a third estimated mixture model of the third sub-event with another Gaussian distribution corresponding to the third sub-event time and another multinomial distribution corresponding to content of messages at the third sub-event time;
  identify that a sub-event does not occur at the third sub-event time in response to the MLE process applied to the third estimated mixture model generating a Gaussian distribution with a parameter corresponding to standard of error exceeding a predetermined threshold.

14. The system of claim 8, the processor being further configured to:
  identify a third sub-event time corresponding to another increase in message frequency in the first message stream;
  generate a third estimated mixture model of the third sub-event with another Gaussian distribution corresponding to the third sub-event time and another multinomial distribution corresponding to content of messages at the third sub-event time;
  identify that the third estimated mixture model corresponds to the first sub-event time in response to the MLE process applied to the third estimated mixture model generating a Gaussian distribution with a parameter corresponding to a mean time being within a predetermined threshold of a mean time parameter of the Gaussian distribution in the first estimated mixture model; and
  merge the first estimated mixture model and the third estimated mixture model.

* * * * *